May 27, 1958   C. C. STUART   2,836,277
SKID FOR LOADING VEHICLE TRANSPORTS
Filed May 10, 1957
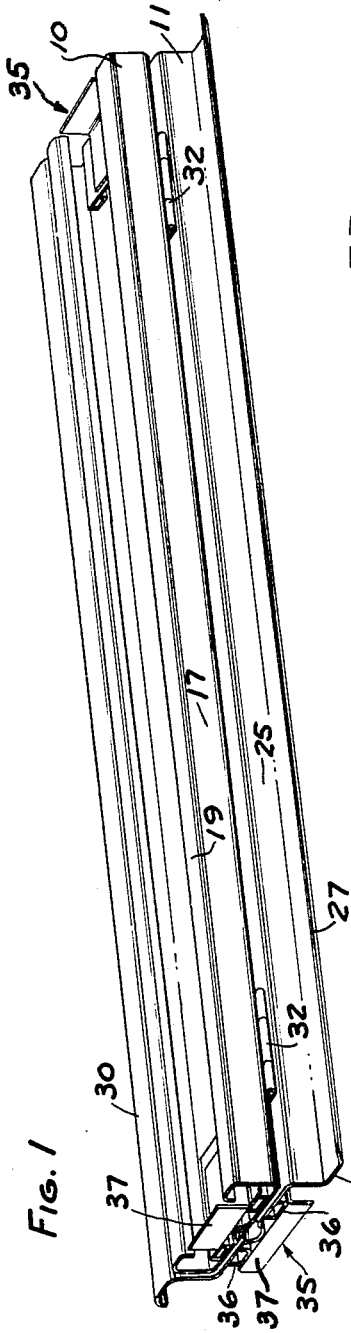
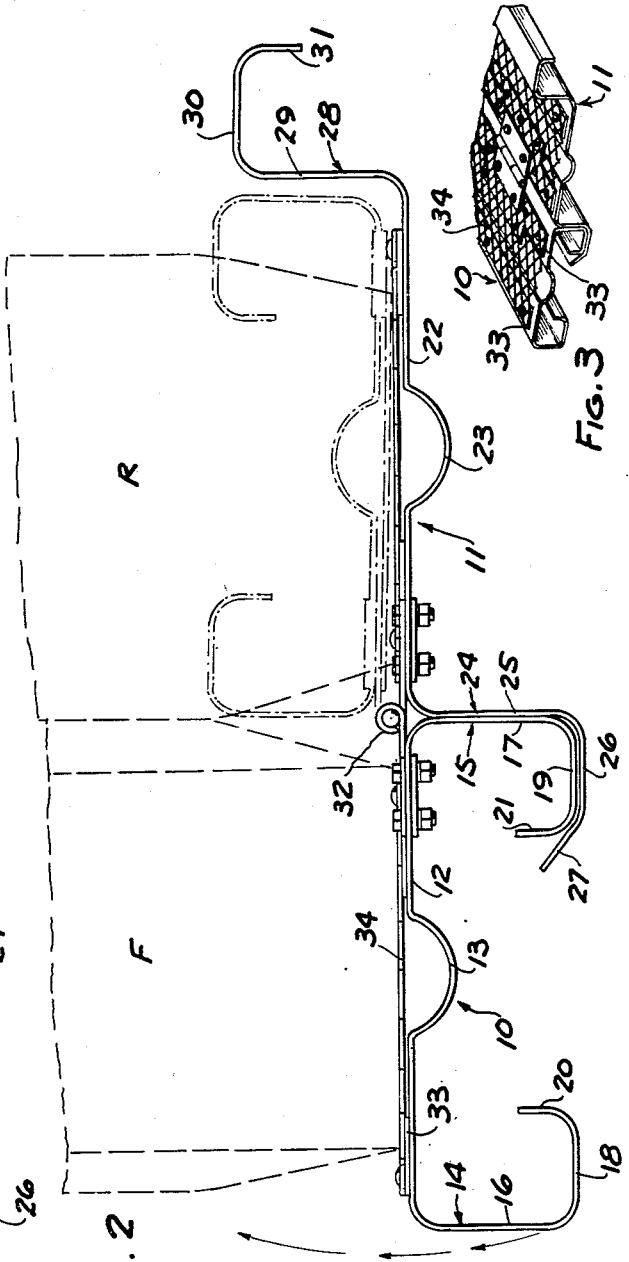
INVENTOR.
CLARENCE C. STUART
BY
ATTORNEYS.

United States Patent Office 2,836,277
Patented May 27, 1958

2,836,277

SKID FOR LOADING VEHICLE TRANSPORTS

Clarence C. Stuart, Dearborn, Mich., assignor to Traffic Transport Engineering, Inc., Dearborn, Mich., a corporation of Michigan Application May 10, 1957, Serial No. 658,466

15 Claims. (Cl. 193—41)

This invention relates to a skid for loading vehicle transports and particularly to a skid for loading trucks on vehicle transports.

In the loading of vehicle transports skids are used to provide a ramp over which the vehicles are driven to load the transport. Such skids are also used between the tracks of the transport when the vehicle is loaded by moving it from one track to another.

In some types of vehicles, particularly trucks, the wheel span or spread at the front of the vehicle differs from that at the rear, and as a result the width of each skid must be sufficiently great so that an effective ramp will be provided. For example, in loading one make of truck now being manufactured that is provided with widely spaced front wheels and dual wheels at the rear the width of the track formed by the skid must be at least twenty-two inches. When a skid of this width is use it becomes extremely difficult for one man to handle.

It is an object of this invention to provide a skid for loading vehicles which is foldable longitudinally so that it may be handled easily by one man.

It is a further object of this invention to provide such a skid which is strong in its extended or loading position to withstand the heavy loads incident to movement of the vehicles over the skid in order to load the transport.

It is a further object of this invention to provide such a skid which may be readily folded from a vehicle-loading position to the compact position without the use of tools, clamps or the like.

In the drawings:

Fig. 1 is a perspective view of the skid embodying the invention and shown in compacted or folded position.

Fig. 2 is an end elevational view on an enlarged scale of the skid embodying the invention, shown in extended or loading position with parts being broken away.

Fig. 3 is a fragmentary perspective view of the skid in extended or loading position, parts being broken away.

Referring to Figs. 1 and 2, the skid embodying the invention comprises a first section 10 and a second section 11 hinged for folding movement as presently described.

As shown in Fig. 2, first track section 10 comprises a flat longitudinally extending track portion 12 having a central longitudinally extending groove or trough 13. Track section 10 is provided with flanges 14, 15 extending along the longitudinal edges of track portion 12 and lying entirely on one side of the plane of track portion 12. Flanges 14, 15 are identical in shape and comprise a first leg 16, 17 extending at right angles from track portion 12 and a second leg 18, 19 extending at right angles from first legs 16, 17, respectively, and inwardly of track section 10. Each flange 14, 15 includes a lip 20, 21, respectively, extending at right angles from second leg 18, 19 and toward track portion 12.

Second section 11 includes a longitudinally extending track portion 22 having a longitudinally extending groove 23. Track section 11 is provided along one longitudinal edge with a flange 24. Flange 24 is complementary to flange 15 and comprises a first leg 25 extending at right angles from track portion 22 and a second leg 26 at right angles to first leg 25 and extending outwardly from track portion 22. Flange 24 also includes a diagonal lip 27 extending outwardly and toward the plane of track portion 22. Track section 11 is also provided with a flange 28 along its other longitudinal edge and lying entirely on the side of plane 22 opposite that of flange 24. Flange 28 includes a first leg 29 extending at right angles from track portion 22, a second leg 30 extending at right angles from first leg 29 and outwardly from track portion 22 and a lip 31 extending at right angles to second leg 30 and toward the plane of track portion 22.

Longitudinally spaced hinges 32 are provided for pivoting or hinging section 10 to section 11. As shown in Fig. 2, each hinge is bolted to track portions 12, 22. In order to provide the maximum traction on track portions 12 and 22 metal strips 33 are bolted along the edges of the track portions 12, 22 and longitudinally extending strips 34 of expanded metal are welded to strips 33. Hangers 35 are provided at the ends of each track section to form a means for hooking the ends of the track sections on portions of the vehicle transport to place the skid in position for loading vehicles. As shown in Fig. 1, hangers 35 comprise short longitudinally extending channels 36 welded to track portions 12, 22 on the side opposite the strips 34 and transversely extending angles 37 welded to the channels 36.

As shown in Fig. 2, the skid is in position for loading with track sections 10, 11 folded outwardly to bring track portions 12, 22 in position so that they lie in substantially the same plane. In this position flange 15 is interengaged with flange 24 to prevent the track sections 10, 11 from further folding movement and to provide reinforcement centrally of the skid to increase its resistance to longitudinal bending. In loading position the skids are arranged so that the flanges 28 are positioned along the inner edges of the skids to perform the additional function of a curb for guiding the wheels of the vehicle as it is loaded on the transport. Grooves 13, 23 form drain troughs for ice, snow and rain.

In the extended or loaded position the track portions 12, 22 form a track or ramp of sufficient width to permit the loading of vehicles such as trucks which have a different wheel span at the front of the vehicle than at the rear. For example, as shown by the dotted lines in Fig. 2, the wheel span at the front may be such that front tire F will be supported primarily by track portion 12 while the wheel span at the back may be such that rear tire R will be supported primarily by the track portion 22. In the case where the vehicle has dual wheels at the rear, it is necessary to remove the outer of each pair of dual wheels in order to clear the superstructure of the trailer.

After loading, the skid may be folded by pivoting section 10 to the nested position shown in broken lines in Fig. 2 with track portion 12 in overlying relationship to track portion 22. It should be noted that the width of track portion 12 of section 10 is less than the width of track portion 22 of section 11 so that track portion 12 is adjacent and substantially parallel to track portion 22 and flange 14 is adjacent flange 28.

After being folded, the skid may be easily handled by one man. The sections 10, 11 of the skid are preferably made of a lightweight metal such as aluminum to further facilitate the ease of handling.

I claim:

1. In a skid for loading vehicles on vehicle transports, the combination comprising a pair of sections, each said section having a longitudinally extending track portion, means hinging said sections to each other along adjacent longitudinal edges for folding movement from a position wherein said track portions lie in substantially the same plane to a position wherein said track portions are in overlying relationship, means on each of said sections interengageable when said sections are in such a position that the track portions lie in substantially the same plane.

2. The combination set forth in claim 1 wherein said interengaging means comprise a longitudinally extending flange on one said section and a complementary longitudinally extending flange on the other said section.

3. The combination set forth in claim 2 wherein said flange on one said section comprises a first leg extending at right angles from the track portion of said one section and a second leg extending at right angles from said first leg and inwardly of said section.

4. The combination set forth in claim 1 including reinforcing flanges extending longitudinally along the free edges of each track portion.

5. The combination set forth in claim 1 including a hanger at one end of each said section for engagement with the vehicle transport.

6. The combination set forth in claim 1 including a strip of expanded metal fastened to each said section and overlying the track portion thereof.

7. In a skid for loading vehicle transports, the combination comprising a first section having a substantially flat longitudinally extending track portion, a flange along each longitudinal edge of said first section and extending entirely on one side of the plane of said track portion of said first section, a second section having a longitudinally extending track portion, means for hinging said first section to said second section along adjacent longitudinal edges of the respective track portions, said second section having a flange along the longitudinal edge thereof adjacent said hinge means and extending on one side of the plane of the track portion of said second section, said last-mentioned flange being complementary and interengaging the adjacent flange on the first section when the track portions of said first and second sections lie in substantially the same plane, said second section being formed with a second flange along the other longitudinal edge thereof, said second flange lying entirely on the side of the plane of the track portion of said second section opposite to that of the first flange of said second section, the width of said first section being less than the width of said second section whereby when said first section is folded to bring the track portion thereof into overlying relationship to the track portion of said second section the flange along the free edge of said first section is adjacent the second flange on the second section.

8. The combination set forth in claim 7 including a hanger fastened to one end of each said track portion for facilitating the engagement of the sections with a vehicle transport.

9. The combination set forth in claim 7 wherein said hinge means comprises hinges fastened to the track portions, said hinges being longitudinally spaced.

10. The combination set forth in claim 7 including a strip of expanded metal fastened to the track portion of each said section.

11. The combination set forth in claim 7 wherein each said section is made of a lightweight metal.

12. The combination set forth in claim 11 wherein said lightweight metal comprises aluminum.

13. In a skid for loading vehicles on vehicle transports, the combination comprising a pair of track sections hinged together along their adjacent longitudinal edges, one of said track sections having depending flanges along its longitudinal edges, the free edges of said flanges being turned inwardly, the other track section having flanges along its longitudinal edges, one extending upwardly along the outer edge and the other extending downwardly along the inner edge of said last-mentioned track section, said last two mentioned flanges having their free edges turned outwardly, the flanges along the inner edges of said track sections being dimensioned such that in the operative position they are in coplanar engagement with the outwardly turned edge of the one flange underlying the inwardly turned free edge of the other flange.

14. The combination set forth in claim 13 wherein said upwardly extending flange is spaced slightly further from the hinged connection than the depending flange along the outer edge of the other section.

15. The combination set forth in claim 13 wherein the inwardly turned edges of the first pair of flanges have their extreme edge portions turned upwardly in a plane generally parallel to the depending portions of said first pair of flanges and wherein the outwardly turned edge of the depending flange of the second track section has its extreme edge portion inclined upwardly at an angle such as to clear the inwardly turned free edge of the adjacent depending flange when the two track sections are pivoted about their hinged connection.

No references cited.